United States Patent [19]

Cunningham

[11] 4,125,957
[45] Nov. 21, 1978

[54] FISHING ROD HOLDER AND INDICATOR ASSEMBLY

[76] Inventor: James C. Cunningham, 2413 W. 25th St., Topeka, Kans. 66611

[21] Appl. No.: 850,952

[22] Filed: Nov. 14, 1977

[51] Int. Cl.² .......................................... A01K 93/00
[52] U.S. Cl. ...................................................... 43/17
[58] Field of Search ............... 43/17, 16, 42.36, 42.49, 43/44.87, 44.9

[56] References Cited

U.S. PATENT DOCUMENTS 3,023,532   3/1962   Gorenty .................................... 43/17

FOREIGN PATENT DOCUMENTS 1,412,953   11/1975   United Kingdom ........................ 43/17

Primary Examiner—Robert C. Watson
Attorney, Agent, or Firm—Schmidt, Johnson, Hovey & Williams

[57] ABSTRACT

A fish bit-indicator assembly adapted for use with an ordinary fishing rod and line comprises a weighted, slack ring device slidably attached to a stretch of the fishing line between guide ferrules of the rod and produces gravity-induced sagging of the line away from the rod in the absence of a fish bite when the rod is in a position tilted from vertical to create a slack section in the line along the rod. The slack ring holds the slack line section between the rod ferrules in tension and functions in response to even minute movement of the bait in any direction during a fish bite to sharply shift in elevation and thereby signal the bite, even when the line between the rod and the bait is swayed due to wind currents or water waves. A fishing tackle mounted rod support is provided for maintaining the rod in a desired tilted position when unattended in order to allow the slack ring to create a slack section in the line of optimum configuration for signaling the existence of a bite.

10 Claims, 6 Drawing Figures

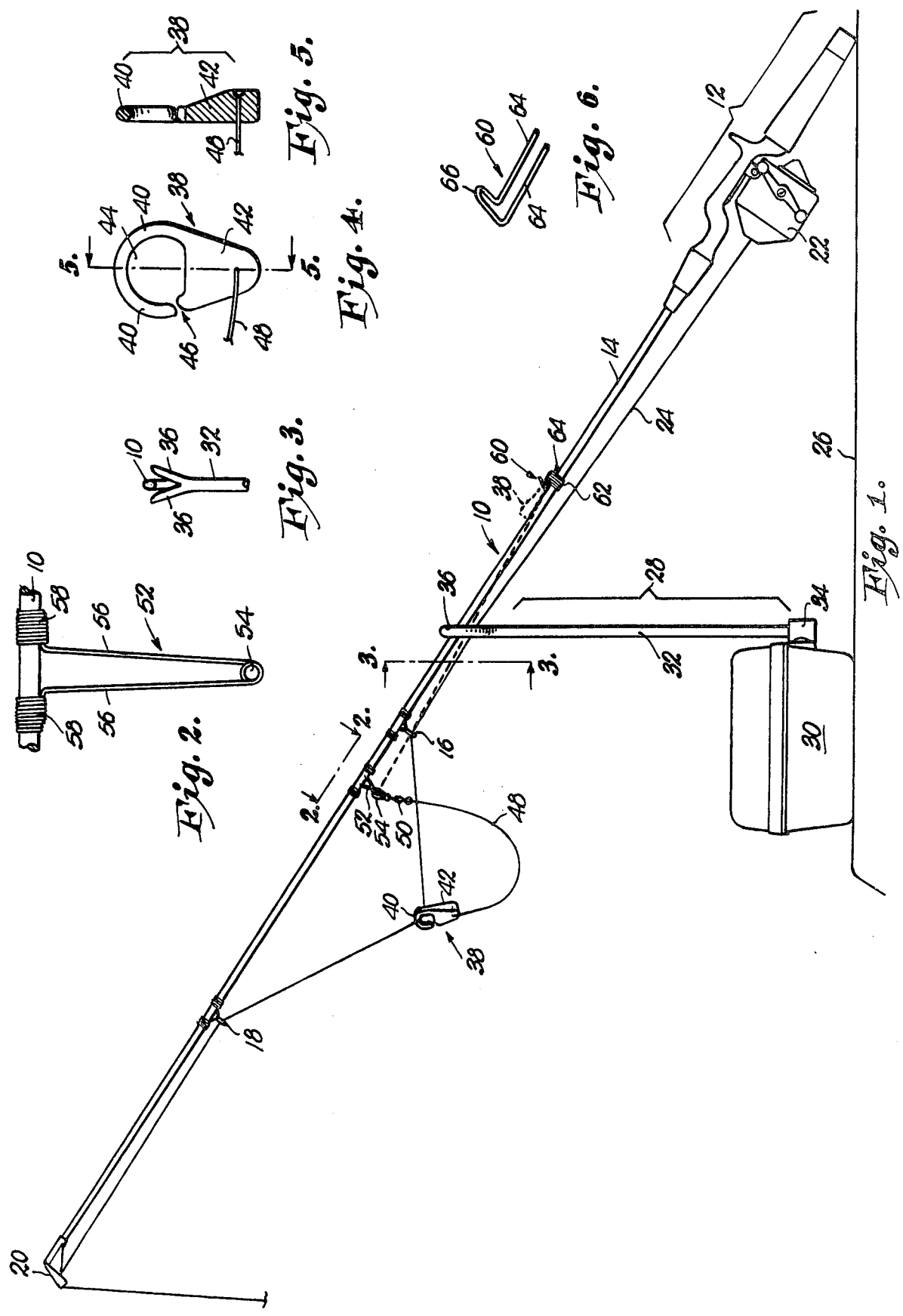

FISHING ROD HOLDER AND INDICATOR ASSEMBLY

BACKGROUND AND BRIEF DESCRIPTION OF THE INVENTION

This invention generally relates to bait fishing apparatus, including a fishing rod and baited line, and deals more particularly with novel means for providing reliable indication of the existence of a fish bite.

Traditionally, fishermen have attempted to detect the existence of a fish bite by watching the rod tip for flexing movement induced by sudden line tension caused by the bite, or by directly sensing this sudden tension by holding the line between the fingers to "feel" the bite. The use of the rod tip to indicate a bite usually necessitates that the rod be held in a special position and is often ineffective to signal small nibbles or gentle bites which may be insufficient to cause the rod tip to flex. Holding the line with the fingers is effective under some circumstances, but this approach requires that the line be attended by the fisherman, and restricts his freedom of movement while waiting for a bite to occur. The problem of detecting a fish bite is often complicated by various environmental conditions which are commonly encountered, such as waves on the surface of the water or wind currents; either of these conditions can cause stretches of the line between the rod and the bait to waiver back and forth, or in the case of strong, steady wind currents, these stretches of the line may be maintained in a constant bowed condition, even when a tension force is applied at either end of the line, as when a fish takes the bait or when the line is at least partially reeled in by the fisherman.

Others have been aware for some time of the problem of detecting a fish bite as evidenced by U.S. Pat. Nos. 3,023,532; 3,143,822, and 3,916,554, which disclose various types of apparatus adapted to be used with a rod and line combination for indicating the existence of a bite on the line. Each of the devices in the above-noted prior art patents is sensitive to the application of tension on the line which occurs when a fish moves the bait in a direction away from the rod, and function to produce a visual signal when a prescribed tension has been imposed on the line. However, these prior art devices are less than completely satisfactory since line tension produced by waves or wind can give rise to faulty indications of a bite; moreover, none of these previous indicators is operative to signal a bite when the fish is taking and moving the bait in a direction toward the rod.

The present invention overcomes the above-mentioned deficiencies inherent in prior art indicator designs and provides an especially simple but significantly improved means of indicating the existence of a fish bite. According to the present invention, a portion of the line along the rod is trained through an aperture in a weighted slack ring device which slidably engages the line between a pair of guide ferrules on the rod, and functions to create a slack portion in the line along the rod. The slack ring device is swively tethered to a standoff element secured to the rod adjacent the slack portion of the line, and functions to limit the downward travel of the slack ring device, and thereby control the amount of line which is included in the slack portion thereof. In the absence of a bite condition, the slack ring device is suspended from the line and remains stationary. Under adverse environmental conditions when waves or wind cause the line to waiver thereby varying the tension in the slack portion of the line, the line slides to-and-fro through the slack ring device, and the latter remains essentially stationary. However, under a bite condition when the fish moves the bait in a direction away from the rod, the slack ring device sharply shifts in elevation thereby indicating the presence of the bite; moreover, when the fish moves the bait in a direction toward the rod, the slack ring device likewise sharply shifts in elevation thereby positively signaling the presence of the bite. As a futher feature of the invention, the rod may be supported at a prescribed angle by means of an upright support element removably mounted on a portable base such as a tackle box.

A primary object of the invention is to provide unique apparatus for indicating the presence of a fish bite.

Another object of the present invention is to provide an indicator assembly for signaling the existence of a fish bite which is particularly simple in construction and is not subject to giving rise to false indications as a result of wind currents or water waves acting to produce tension in the fishing line.

A further object of the present invention is to provide an indicator assembly of the mentioned type which is effective in signalling a condition when a fish moves the bait at the end of the line in a direction toward the rod, thereby lessening the tension in the fishing line.

A still further object of the present invention is to provide apparatus of the mentioned type which is effective in signalling slight degrees of movement of the bait, even when the line between the bait and the rod is maintained in a bowed condition by heavy wind currents.

Another object of the invention is to provide means for releasably holding the indicator assembly on the rod in a manner which does not interfere with the casting of the line.

A further object of the present invention is to provide a rod holder including an upright rod support removably mounted on a portable base, such as a tackle box.

Other and further objects of the invention will be made clear or become apparent in the course of the following description of a preferred embodiment of the invention.

DETAILED DESCRIPTION OF THE INVENTION

In the drawings:

FIG. 1 is a side elevational view of a fishing rod and line combination shown in operative relationship to a rod holder, the position of the indicator assembly when in use being shown in full line, the nonuse position of the indicator assembly being shown in phantom;

FIG. 2 is a plan view taken along line 2—2 in FIG. 1;

FIG. 3 is a cross-sectional view taken along line 3—3 in FIG. 1;

FIG. 4 is a front view of the slack ring device showing a portion of tether means attached thereto;

FIG. 5 is a cross-sectional view taken along line 5—5 in FIG. 4; and

FIG. 6 is a perspective view of the slack ring holder which has been removed from the rod.

Turning now to the drawing, a fishing rod of the conventional type, generally indicated by the numeral 10, includes a handle portion 12 and a flexible, elongate rod element 14 having aligned guide ferrules 16 and 18 suitably secured along central stretches thereof, there being further provided a tip guide ferrule 20 secured to the outer extremity of the rod 10. A manually operable reel 22 of the ordinary type is suitably mounted on the handle portion 12 for storing and manipulating a source of fishing line 24 which is trained through the ferrules 16, 18 and 20, the outer end of the line 24 having attached thereto bait means (not shown) for catching a fish, and typically including hooks or the like.

As disclosed herein, the handle portion 12 of rod 10 rests on a supporting surface 26, while central stretches of the rod 10 are supported by novel support structure 28. Support structure 28 comprises a base section 30 such as a fishing tackle box or the like, and an elongate, upright support member 32 having the lower end thereof held by mounting means 34 which includes suitable mechanism for removably mounting the member 32 on the base section 30. The bifurcated upper end of support member 32 includes a pair of upwardly divergent retaining elements 36 between which the rod 10 may be held.

A teardrop shaped, slack ring signalling device generally indicated by the numeral 38 includes an arcuate neck portion 40 and forms in combination with weight means 42 a ring shaped element having an aperture 44 therethrough. The neck portion 40 is shown herein as having a circular cross section and includes a line receiving passageway 46 adjacent the weight means 42 for purposes which will be discussed later. The slack ring device 38 may be made of any suitable material, however it is significant that the weight means 42 possess a mass substantially greater than the mass of the neck portion 40. Tether means comprising an elongate, freely flexible restraining element 48 has one end thereof secured to the weight means 42 of the slack ring device 38, while the opposite end thereof is mounted by means of a swivel mechanism 50 to the outer extremity of a standoff member 52 and more particularly to an eyelet 54 therein. Standoff member 52 comprises a pair of spaced, elongate legs 56 extending radially outward from rod 10 at a point circumferentially spaced from the line 24, each of the legs 56 being suitably secured as with filament wrappings 58 on the rod 10. A slack ring device holder or keeper means 60 is secured to the rod 10 by means of filament wrapping 62 at a point longitudinally spaced from the standoff member 52 a distance essentially corresponding to the length of the restrainingelement 48. Keeper means 60 includes a pair of parallel legs 64, and a generally U-shaped upturned outer extremity 66 which forms an acute angle with respect to the legs 64 and is inclined away from the standoff member 52 when mounted on the rod 10 as shown in FIG. 1.

In use, with the rod 10 maintained in a position tilted from vertical, the indicator assembly provides a novel and especially reliable means for signalling the existance of a fish bite at the end of the line 24. Assuming that the line 24 has been cast, a portion of the line 24 between the ferrules 16 and 18 is passed through the passageway 46 so that the line 24 is trained through the aperture 44. With the slack ring device 38 thus attached to the line 24, the neck portion 40 of the device 38 slidably engages the line 24 and suspends the device 38 from the line, with the weight means 42 tending to urge portions of the line 24 away from the rod so that a slack section in the line 24 between the ferrules 16 and 18 is created. The amount of line in the slack section created by the slack ring device 38 will depend in part on the tension in the line 24, and may be adjusted somewhat by manipulation of the reel 22. Assuming now that a slack portion in the line 24 has been created by the slack ring device 38, the device 38 is slidably suspended from the line 24 between ferrules 16 and 18, and in the absence of a bite on the end of the line, the device 38 will remain essentially stationary in elevation relative to the rod 10. In the event that wind currents or water waves are acting upon portions of the line between the tip 20 and bait in a manner to cause the line to waiver or shift about, the slack ring device 38, by virtue of its relatively substantially mass, functions to absorb the shock created in the line 24 as a result of such environmental conditions thus tending to minimize the movement of the line consequently, the slack ring device 38 remains at an essentially constant elevation, even under the adverse environmental conditions described above. On some occasions, when wind currents or the like are particularly strong, the line 24 may be caused to substantially bow between the tip 20 and the bait, whereupon the slack section in the line between the ferrules 16 and 18 will decrease slightly, in turn causing the slack ring device 38 to slide therealong slightly and slowly change its elevation somewhat. When however, a fish moves the bait in a direction away from the rod a sharp tension is imposed on the line 24 causing the slack section between the ferrules 16 and 18 to rapidly play out whereupon the slack ring device 38 rides along with the line and sharply shifts upwardly in elevation thereby affirmatively signalling the existence of a fish bite. Similarly, when a fish moves the bait in a direction toward the rod, a sharp decrease in line tension results and the slack section between the ferrules 16 and 18 rapidly increases thereby causing the slack ring device 38 to shift sharply downwardly in elevation thereby also affirmatively signalling the existence of a fish bite.

It is to be pointed out that the amount of slack in the line 24 between the ferrules 16 and 18 is limited since the retaining element 48 limits the downward travel of the slack ring device 38 and thus limits the amount of line 24 which may be drawn away from the rod 10. It is significant to note that the retaining element 48 is held in spaced relationship to the line 24 by means of the standoff member 52 so that the line 24 does not interfere with the operation of the slack ring device 38. When it is desired to either reel in the bait, or after the bait has been reeled in and it is desired to recast the line, the slack ring device 38 may be removed from the line 24 by slipping the latter through the passageway 46 thereby releasing the device 38 from the line 24, whereupon the device 38 may be transferred to a nonuse position and held on the rod by placing the aperture 44 of the device 38 through the hook portion 66 of keeper means 60. With the slack ring device 38 thus maintained in a nonuse position, the line 24 may then be recast whereupon the slack ring device 38 may be removed from the keeper means 60 and reattached to the line 24 in a position of use.

From the foregoing, it is clear that the invention provides especially simple means for indicating the existence of a fish bite, but yet which is not subject to giving rise to false indications. Thus, it will be observed that my indicator assembly and rod holder not only provide for the reliable accomplishment of the objects of the invention, but do so in a particularly simple and reliable manner. It is recognized, of course, that those skilled in the art may make various modifications or additions to the preferred embodiment chosen to illustrate the invention without departing from the gist and essence of my contribution to the art. Accordingly, it is to be uderstood that the protection sought and to be afforded hereby should be deemed to extend to the subject matter claimed and all equivalents thereof fairly within the scope of the invention.

I claim:

1. In combination with fishing apparatus of the type having a length of line baited at one end thereof and confined for movement along a rod member for manipulating said line, an indicator assembly for signalling a fish bite on said line comprising:

weight means releasably attached to a portion of said line along said rod and functioning under gravity influence to urge stretches of said line adjacent said portions thereof away from said rod whereby to produce a section of slack in said line along said rod, said weight means including structure defining a line guiding opening for training said line therethrough, parts of said structure slidably engaging said line portions and functioning to suspend said weight means from said line;

shiftable tether means having one end thereof connected to said weight means for limiting movement of the latter away from said rod and thereby limit the amount of slack in said slack section;

means secured on said rod for mounting the opposite end of said tether means on said rod, said weight means functioning in the absence of a fish bite at said one end of said line to maintain a generally constant elevation with respect to said rod, said weight means functioning in response to a fish bite on said one end of said line to sharply shift in elevation whereby to signal the existence of said bite; and keeper means spaced from said mounting means along said rod and secured to the latter for releasably holding said weight means in a nonuse position when said weight means is detached from said line, whereby to allow manipulation of said line without interference therewith by said weight means.

2. The invention of claim 1, wherein said weight means structure comprises a ring portion within which said line may be confined, said ring portion including an outwardly extending passageway in the periphery thereof to permit withdrawal of said line from said weight means whereby to allow the latter to be shifted to said non-use position thereof.

3. The invention of claim 2, wherein said weight means further comprises:

an elongate weight element having a substantial mass in relationship to the mass of said ring portion,
   said weight element being secured to said ring portion on one side of the latter,
   said one end of said tether means being secured to said weight element.

4. The invention of claim 3, wherein:

said tether means comprises an elongate, freely flexible element, and
   said mounting means comprises elongate structure extending radially outward from said rod and being provided at the outer extremity thereof with means for securing said opposite end of said tether means in spaced relationship to said rod thereby spacing said flexible element away from said line to avoid interference of the former with the latter.

5. The invention of claim 4, wherein said keeper means comprises:

a hook element depending from said rod away from said line and inclined away from said mounting means,
   said hook element being disposable through said ring portion of said weight means for keeping the latter in said nonuse position thereof.

6. The invention of claim 5, wherein there is further provided means for supporting said rod in a position inclined from vertical, comprising:

an upright support member having the upper extremity thereof provided with a bifurcated portion including a pair of branch members adapted to receive and support said rod therebetween,
   a base section including an essentially flat bottom surface adapted for contacting a substantial area of an underlying supporting surface, and
   means secured to said base section for removably mounting said support member on said base section.

7. For use with a fishing rod having at least a pair of spaced guide ferrules thereon for guiding and confining a fishing line along one longitudinal side of said rod, portions of said line distal from said rod including bait means for catching fish, apparatus responsive to the movement of said bait means for indicating a fish bite but being insensitive to movement of said line due to water waves or wind currents, comprising:

a signalling element slidably suspended from said line between said pair of guide ferrules,
   said signalling element having a sufficient mass to be shifted away from said rod under the force of gravity whereby to draw stretches of said line along said rod away from the latter to produce a slack section in said line between said ferrules;
   a shiftable, elongate restraining member having one end thereof connected to said signalling element for limiting the movement of the latter away from said rod and thereby limit the amount of line slack in said slack section;
   elongate mounting structure secured to said rod and extending outwardly away from the latter at a position circumferentially spaced from said one longitudinal side of said rod,
   said mounting structure including means on the outer extremity thereof for mounting the opposite end of said restraining member whereby to space the latter away from said line and avoid interference with operation of the former by the latter,
   said signalling element remaining at an essentially constant elevation in the absence of a fish bite on said distal portions of said line even when intermediate stretches of said line are acted upon by said water waves or wind currents,
   said signalling element being shiftable from a use position suspended on said line to a nonuse position removed from said line,
   said signalling element being operative when in said use position thereof to sharply shift in elevation whereby to affirmatively indicate the occurrence of a fish bite; and,
   keeper means longitudinally spaced on said rod from said mounting structure and secured to said rod on the side of the latter essentially opposite said one longitudinal side thereof,
   said keeper element functioning to cooperatively engage said signalling element and releasably hold the latter in said nonuse position thereof whereby to permit manipulation of said line unhampered by said signalling element.

8. The invention of claim 7, wherein said signalling element comprises:
an arcuate neck portion generally defining an aperture adapted to receive said line therethrough, and
weight means having a substantial mass compared to the mass of said neck portion, and being secured to the latter.

9. The invention of claim 8, wherein:
said neck portion generally forms the shape of a ring and includes a line receiving passageway therein adjacent said weight means for allowing said line to be inserted or removed from said aperture.

10. The invention of claim 8, wherein there is further provided means for supporting central stretches of said rod on a supporting surface, comprising:
an elongage, upright support member,
the upper extremity of said support member including a pair of diverging retaining elements between which said rod may received and retained in supported relationship on said supporting member,
a supporting base adapted to rest on said supporting surface, and
mounting means secured to said base including releasable holding means for removably holding said support member on said base.

* * * * *